US006656304B2

(12) United States Patent
Furuta et al.

(10) Patent No.: US 6,656,304 B2
(45) Date of Patent: Dec. 2, 2003

(54) METHOD FOR MANUFACTURING A PTC ELEMENT

(75) Inventors: Kazutaka Furuta, Kanuma (JP); Norikazu Iwasaki, Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/749,565

(22) Filed: Dec. 28, 2000

(65) Prior Publication Data

US 2001/0008167 A1 Jul. 19, 2001

(30) Foreign Application Priority Data

Jan. 14, 2000 (JP) ....................................... 2000-010212

(51) Int. Cl.[7] ............................ B32B 31/00; H01C 7/02

(52) U.S. Cl. ....................... 156/216; 156/242; 156/250; 338/22 R

(58) Field of Search ................................ 156/250, 268, 156/242, 213, 216; 338/22 R

(56) References Cited

U.S. PATENT DOCUMENTS

| | | | | | |
|---|---|---|---|---|---|
| 5,488,348 | A | * | 1/1996 | Asida et al. | 338/22 R |
| 5,852,397 | A | * | 12/1998 | Chan et al. | 338/22 R |
| 6,023,403 | A | * | 2/2000 | McGuire et al. | 338/22 R |
| 6,040,755 | A | * | 3/2000 | Abe et al. | 338/22 R |
| 6,223,423 | B1 | * | 5/2001 | Hogge | 338/22 R |
| 6,242,997 | B1 | * | 6/2001 | Barrett et al. | 338/22 R |
| 6,311,390 | B1 | * | 11/2001 | Abe et al. | 338/22 R |

FOREIGN PATENT DOCUMENTS

| | | | |
|---|---|---|---|
| EP | 1 041 586 | * | 10/2000 |
| JP | 60-158602 | | 8/1985 |
| JP | 6-275408 | * | 9/1994 |
| JP | 9-219302 | * | 8/1997 |
| JP | 10-12404 | * | 1/1998 |
| JP | A-10-261505 | | 9/1998 |
| JP | 10-289806 | | 10/1998 |

* cited by examiner

*Primary Examiner*—Curtis Mayes
(74) *Attorney, Agent, or Firm*—Oliff & Berridge

(57) ABSTRACT

A PTC element with reduced thickness is manufactured are lower cost by forming an electrode layer on a surface of a flat-plate-shaped PTC material, such that it extends over the upper and lower surfaces and at least one of the side surfaces thereof, and forming an upper surface electrode and a lower surface electrode so that the terminals thereof are positioned on one of the surfaces of the PTC material, by partially removing the electrode layer 11 to segment it into a region where the electrode layer 11 is present on either of the upper or lower surfaces of the PTC material 1 and a region where it extends over the upper and lower surfaces as well as a side surface.

2 Claims, 4 Drawing Sheets

METHOD FOR MANUFACTURING A PTC ELEMENT

BACKGROUND OF THE INVENTION

1. Field of the Invention

The present invention relates to a method for manufacturing PTC elements suited for surface mounting.

2. Description of the Related Art

PTC (Positive Temperature Coefficient) elements are known as protective elements for controlling the current which flows through circuits to be protected since their resistance value increases as they give off heat in overcurrent conditions.

PTC elements essentially possess a structure in which the upper and lower surfaces of a flat-plate-shaped PTC material are sandwiched by electrodes; however, in order for these elements to be used in surface mounting, the terminals of the upper and lower electrode need to be together on one surface.

A conventional method for manufacturing such surface mount-type PTC elements involves, as depicted in FIGS. 4A to 4E, sandwiching a PTC material 1 between an upper electrode foil 2*a* and a lower electrode foil 2*b* (FIG. 4A), forming through-holes 3, establishing connection between the upper electrode foil 2*a* and the lower electrode foil 2*b* by filling the through-holes 3 with a plating layer 4 (FIG. 4B), patterning the electrode foils 2*a,* 2*b* of the upper and lower surfaces as well as the plating layer 4 (FIG. 4C), applying an insulating material 5 to the assembly except those portions which are to serve as the electrode terminals on the plating layer 4 (FIG. 4D), then cutting the assembly along cutting lines L which pass through the through-holes 3 (FIG. 4E).

This allows an electrode terminal 6*a* of the upper electrode foil 2*a* and an electrode terminal 6*b* of the lower electrode foil 2*b* to be formed on the bottom surface of the PTC material 1, an electrode terminal 6*a*' of the upper electrode foil 2*a* and an electrode terminal 6*b*' of the lower electrode foil 2*b* to be formed on the upper surface of the PTC material 1, and thereby a PTC element 10X to be obtained, on which surface mounting can be performed at the upper or lower surfaces of the PTC material 1 (FIG. 4E).

However, the steps for manufacturing the PTC element 10X as shown in FIGS. 4A to 4E are complex, and the manufacture costs high. Moreover, the PTC element 10X is not moulded, which results in poor moisture resistance as well as the risk of ignition when the PTC element gives off more heat than normal.

In response to these defects, proposed is the injection mould method of manufacture, as shown in FIG. 5, in which a surface mount-type PTC element 10Y is manufactured by sandwiching the upper and lower surfaces of the PTC material 1 between the electrode foils 2*a*, 2*b*, forming leads 7, 8 to allow the electrode terminals 6*a*, 6*b* of the electrode foils to be accessible on one surface of the PTC material 1, and moulding the whole assembly with a moulding material 9 so as to leave only the electrode terminals 6*a*, 6*b* exposed.

However, even in the procedure for manufacturing of the PTC element 10Y, once the PTC material 1 has been sandwiched between the electrode foils 2*a*, 2*b,* the leads 7, 8 need to be laminated thereon, which necessitates a costly increase in the number of manufacturing steps and components. A further problem is that the thickness of the element will increase. For example, if the thickness of the PTC material $t_1$ is 0.4 mm, the thickness $t_2$ of each electrode foil 2*a*, 2*b* 0.05 mm, the thickness $t_3$ of each lead 7, 8 0.2 mm and the thicknesses $t_{4a}$, $t_{4b}$ of the mould material 9 on the upper and lower surfaces 0.3 and 0.6 mm respectively, the thickness of the whole PTC element assembly $t_0$ will be 1.8 mm.

SUMMARY OF THE INVENTION

In an attempt to resolve the aforedescribed problems with the prior art, it is an object of the present invention to reduce the thickness of surface mount-type PTC elements and enable them to be manufactured at lower cost.

The present inventors perfected the present invention as a result of discovering that surface mount-type PTC elements of reduced thickness can be obtained using a streamlined manufacturing process that is economically advantageous, by forming an electrode layer using an electrode foil or the like so as to wrap a flat-plate-shaped PTC material, partially removing the electrode layer to form upper and lower electrodes, then having the electrode terminals thereof be formed on either the upper or lower surface of the PTC material.

In other words, the present invention provides a method for manufacturing a PTC element, comprising the steps of:

- forming an electrode layer on a surface of a flat-plate-shaped PTC material, such that it extends over the upper and lower surfaces and at least one side surface thereof; and
- removing a portion of the electrode layer to segment it into a region where it is present on either of the upper or lower surfaces of the PTC material and a region where it extends over the upper and lower surfaces as well as a side surface, to form an upper surface electrode and a lower surface electrode of which the terminals are positioned on one of the surfaces of the PTC material.

DESCRIPTION OF THE PREFERRED EMBODIMENTS

The present invention shall be described in further detail with reference to the drawings. The same symbols refer to the same or similar structural elements throughout the drawings.

Figure 1A:
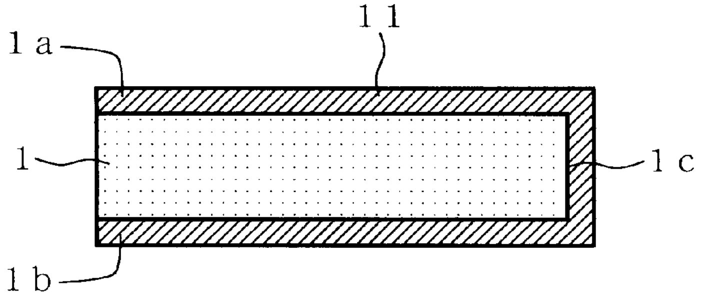
FIGS. 1A to 1C are diagrams depicting processes for manufacturing a PTC element according to an embodiment.
Figure 1B:
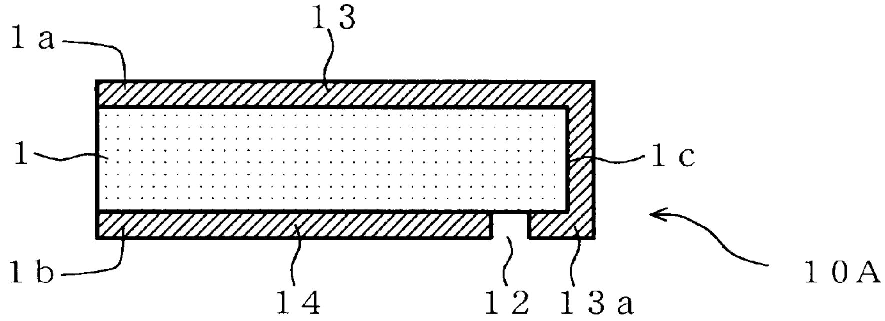
Figure 1C:
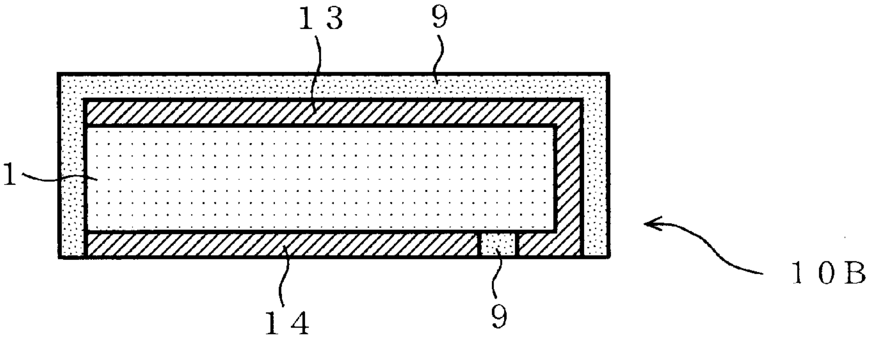

FIGS. 1A to 1C are process diagrams of a manufacturing method of a first embodiment of the present invention. According to this manufacturing method, as shown in FIG. 1A, first, an electrode layer 11 is formed by pressing an electrode foil onto a flat-plate-shaped PTC material 1 so that it extends over the upper and lower surfaces 1*a*, 1*b* and at least one side surface 1*c* of the PTC material 1.

Next, the electrode layer 11 is partially removed by means of a diamond cutter or the like along a break line 12, in order to segment it into a region where the electrode layer 11 is present on the lower surface 1*b* of the PTC material 1 and a region where it extends over the upper surface 1*a*, the side surface 1*c* and the lower surface 1*b* of the PTC material 1 (FIG. 1B). The upper surface electrode 13 and the lower surface electrode 14 are thereby formed from the electrode layer 11, resulting in a PTC element 10A. In this PTC element 10A, one end 13*a* of the upper electrode 13 extends over the lower surface 1*b* of the PTC material 1; therefore, the need to laminate a separate lead etc. is obviated due to the fact that the terminal of the upper electrode 13 and the terminal of the lower electrode 14 are formed on one of the surfaces of the PTC material 1. The positioning of the electrodes thus allows the terminals of the upper electrode 13 and the lower electrode 14 to be formed on the lower surface 1*b* of the PTC material 1. According to this method for manufacturing a PTC element, therefore, the thickness of the element can be reduced and a surface mount-type PTC element readily obtained.

It is preferable for the so-obtained PTC element 10A to be moulded, in consideration enhancing its moisture resistance and preventing ignition when unusual amounts of heat are given off. In particular, e.g., a moulded PTC element 10B can be obtained by applying a mould material 9 thereon, while leaving the terminals of the upper electrode 13 and the lower electrode 14 exposed (FIG. 1C).

Figure 2:
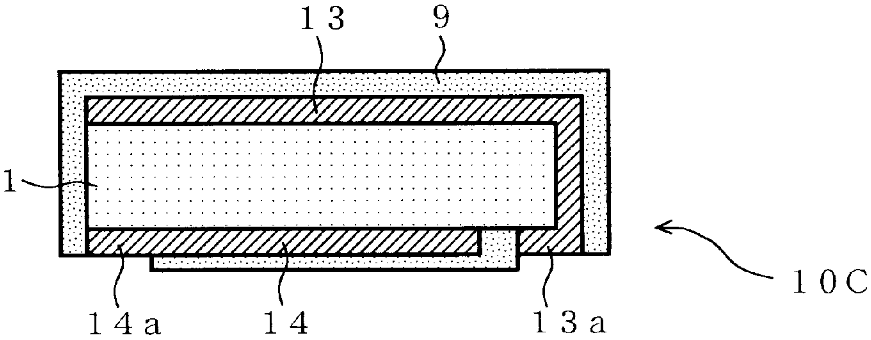
FIG. 2 is a cross sectional view of a PTC element pertaining to a different embodiment.

There is no particular limitation on the configuration of applying the mould material 9 to the PTC element 10A, provided that the terminals of the upper electrode 13 and the lower electrode 14 are accessible. For example, as shown by the PTC element 10C depicted in FIG. 2, the entire surface of the element aside from the terminal portions 13*a*, 14*a* of the upper surface electrode 13 and the lower surface electrode 14 may be covered by the mould material 9.

Figure 3A:
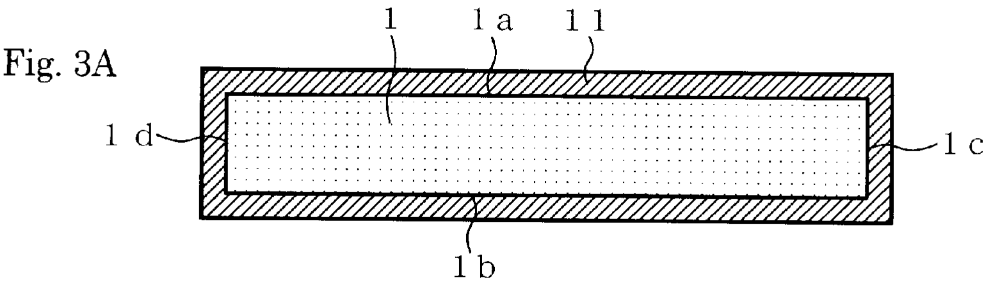
FIGS. 3A to 3D are diagrams depicting processes for manufacturing a PTC element pertaining to a different embodiment.

FIGS. 3A to 3D are process diagrams of a modified example of a method of manufacture pertaining to the present invention. According to this method, the entirety of the upper and lower surfaces 1*a*, 1*b* as well as the two sides 1*c*, 1*d* of the flat-plate-shaped PTC material 1 are covered by an electrode layer 11 which has been electroplated thereon (FIG. 3A).

Figure 3B:
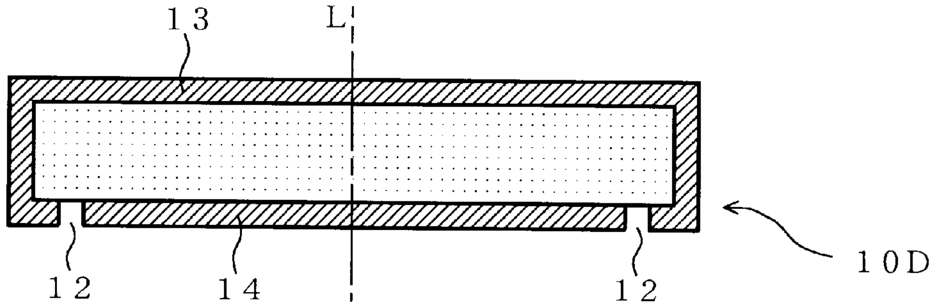
Figure 3C:
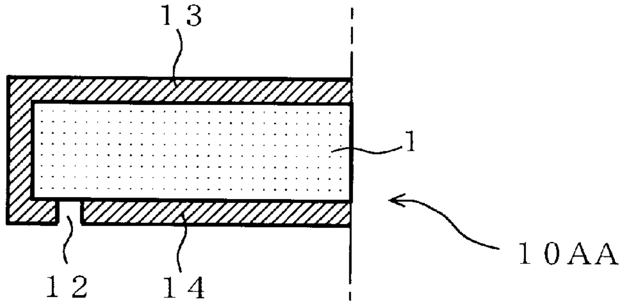
Figure 3D:
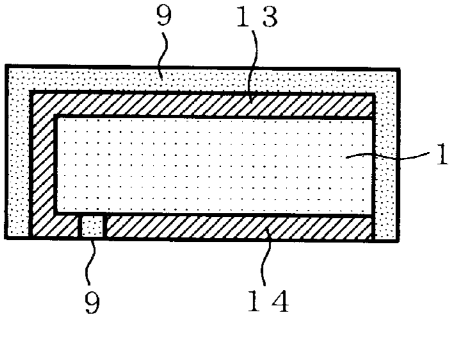
Figure 4A:
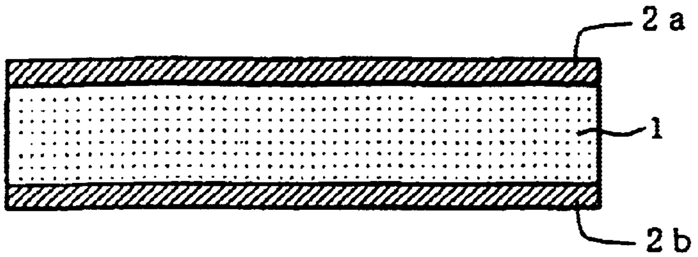
Fig. 4A Related Art
FIGS. 4A to 4E are diagrams which depicts a method for manufacturing a conventional surface mount-type PTC element.
Figure 4B:
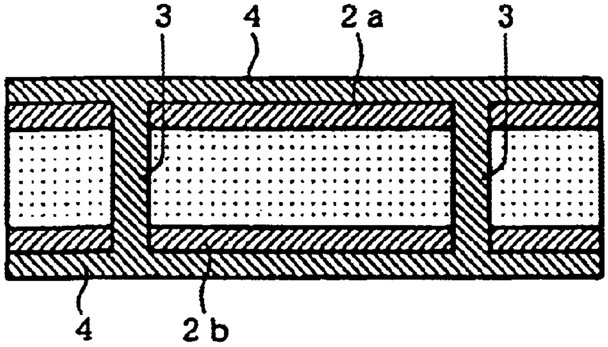
Fig. 4B Related Art
Figure 4C:
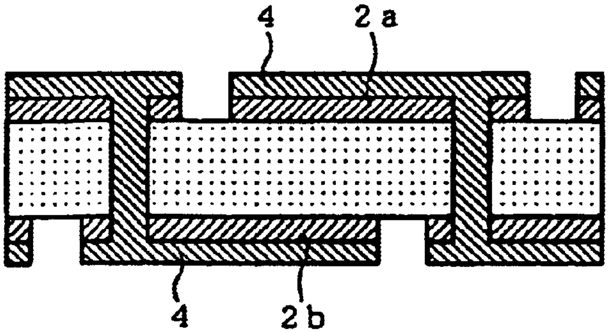
Fig. 4C Related Art
Figure 4D:
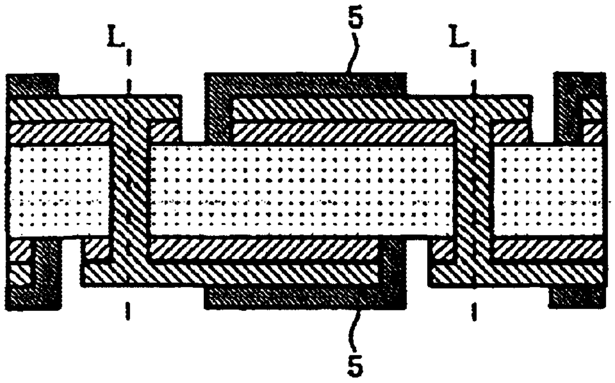
Fig. 4D Related Art
Figure 4E:
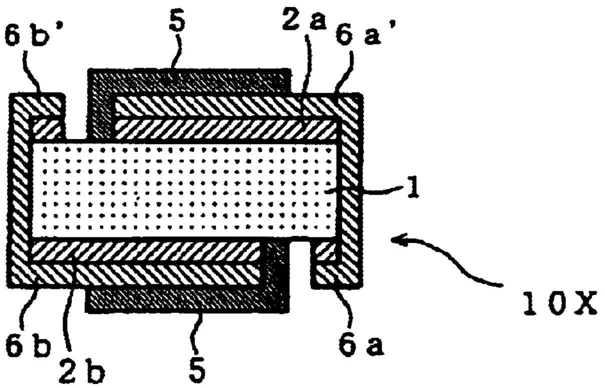
Fig. 4E Related Art

Next, the electrode layer 11 is partially removed by means of a diamond cutter or the like along break lines 12, so as to segment it into a region where the electrode layer 11 is present on the lower surface 1*b* of the PTC material 1 and a region where it extends across the upper surface 1*a*, the side surfaces 1*c*, 1*d* and the lower surface 1*b* of the PTC material 1, resulting in a PTC element 10D which has an upper electrode 13 and a lower electrode 14 (FIG. 3B). Bisecting this PTC element 10D at the centre of the electrode surface along the straight line L perpendicularly to the electrode surface will yield a PTC element 10AA which has the same structure as the PTC element shown in FIG. 1 (FIG. 3C), and which can be moulded using the moulding material 9 (FIG. 3D).

There are no particular limitations as regards the PTC material 1 itself as pertains to the aforedescribed method for manufacturing a PTC element; so-called polymer PTCs, in which conductive fine particles have been dispersed in a crystalline polymer (e.g., a polyolefin-based resin), barium titanate-based PTCs, cristobalite-based PTCs (Japanese Patent Application Laid-Open No. 10-261505) and the like can all be used.

Glass or another inorganic insulating material, or various epoxy-, acrylic- or polyester-based flame-resistant organic resins can be used as the moulding material 9. Printing and coating are cited as examples of methods for moulding PTC elements using such inorganic insulating materials or organic resins.

EXAMPLES

The present invention shall now be described in detail according to the following embodiment.

The PTC element 10B as depicted in FIG. 1C was manufactured in the following manner, in accordance with the manufacturing procedure depicted in FIGS. 1A to 1C. High-density polyethylene (HDPE; Hizex 5000H, manufactured by Mitsui Petrochemical Industries, Ltd.), which is a crystalline polymer, ethylene-ethylacrylate copolymer (EEA; NVC6170, manufactured by Nippon Unika) and microspherical conductive carbon particles which had been subjected to a silver plating treatment (MSB-10A, manufactured by Nippon Carbon) were compounded in a weight ratio of 44:22:34 and the mixture were kneaded at 190° C. using a pressure kneader, and pressed in a hot press (190° C., 5 kg/cm$^2$, 20 sec) to yield a 400 $\mu$m thick film. This film was cut to a size of 2.5 mm×4 mm to yield a PTC material 1.

A 35 $\mu$m-thick electrolytic copper foil was affixed onto the upper surface 1*a*, the side surface 1*c* and the lower surface 1*b* of this PTC material 1 as an electrode layer 11, using a hot press. A diamond cutter was then used to cut the copper foil on the lower surface 1*b* of the PTC material 1 along a 0.5 mm-wide cutting line 12, in the vicinity of the border between the lower surface 1*b* and the side surface 1*c*.

A flame-resistant resin (ELM-1000, manufactured by Nippon Pernox), was applied as a moulding material 9 to the entirety of the element, excepting the terminal portion of the upper surface electrode 13 and the terminal portion of the lower surface electrode 14 to yield a PTC element 10B.

Figure 5:
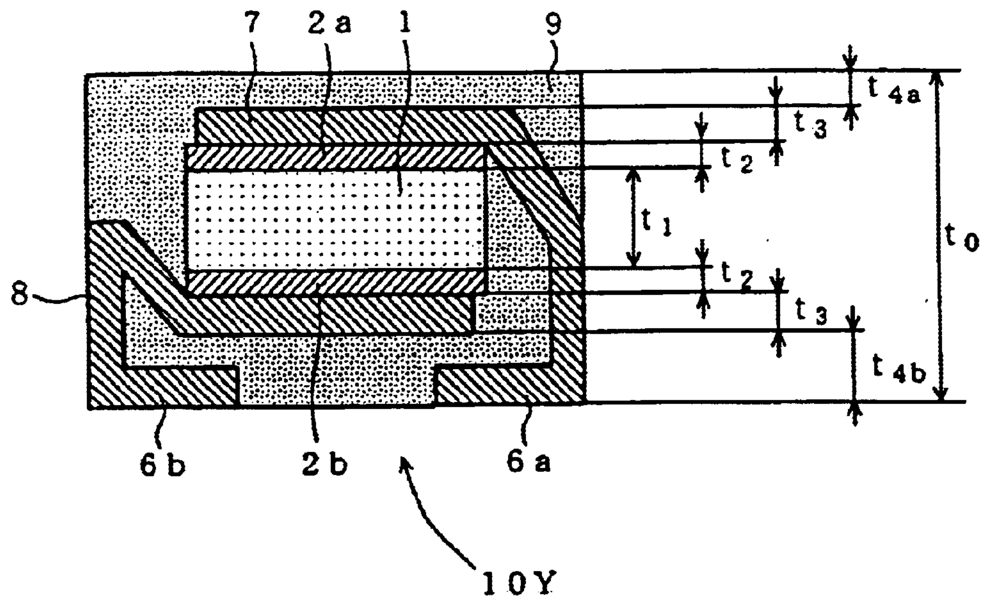
Fig. 5 Related Art
FIG. 5 is a cross sectional view of a surface mount-type PTC element manufactured using an injection moulding method.

The PTC element 10B thus obtained was 0.8 mm thick, which was roughly ½ as thick as the PTC element 10Y shown in FIG. 5.

According to the present invention, surface mount-type PTC elements can be manufactured thinner in an economically advantageous manner.

What is claimed is:

1. A method for manufacturing a PTC element, comprising the steps of:

forming an electrode layer on a surface of a flat-plate-shaped PTC material, such that it extends over the upper and lower surfaces and at least one side surface thereof; and removing a portion of the electrode layer to segment it into a region where it is present on either of the upper or lower surfaces of the PTC material and a region where it extends over the upper and lower surfaces as well as a side surface, to form an upper surface electrode and a lower surface electrode of which the terminals are positioned on one of the surfaces of the PTC material, wherein said electrode layer is formed by affixing an electrode foil to the PTC material.

2. A method for manufacturing a PTC element, comprising the steps of:

forming an electrode layer on a surface of a flat-plate-shaped PTC material, such that it extends over the upper and lower surfaces and at least one side surface thereof;

removing a portion of the electrode layer to segment it into a region where it is present on either of the upper or lower surfaces of the PTC material and a region where it extends over the upper and lower surfaces as well as a side surface, to form an upper surface electrode and a lower surface electrode of which the terminals are positioned on one of the surfaces of the PTC material, wherein said electrode layer is formed by affixing an electrode foil to the PTC material; and a moulding step which is carried out after said electrode layer has been partially removed, to allow the terminal of the upper surface electrode and the terminal of the lower surface electrode to be exposed.

* * * * *